United States Patent [19]

Sundholm

[11] Patent Number: 4,828,160
[45] Date of Patent: May 9, 1989

[54] APPARATUS TO BE USED WHEN WELDING PIPES TOGETHER

[76] Inventor: Göran Sundholm, MagistervÅgen 34 B, SF-02700 Grankulla, Finland

[21] Appl. No.: 112,838
[22] PCT Filed: Mar. 24, 1987
[86] PCT No.: PCT/FI87/00042
 § 371 Date: Sep. 16, 1987
 § 102(e) Date: Sep. 16, 1987
[87] PCT Pub. No.: WO87/05844
 PCT Pub. Date: Oct. 8, 1987

[30] Foreign Application Priority Data

Mar. 26, 1986 [FI] Finland .................................. 861315
Mar. 26, 1986 [FI] Finland .................................. 861316
Aug. 21, 1986 [FI] Finland .................................. 863381
Feb. 2, 1987 [FI] Finland .................................. 870437

[51] Int. Cl.$^4$ ............................................... B23K 9/16
[52] U.S. Cl. ........................................ 228/42; 219/59.1; 219/137.63; 269/48.1; 269/43; 269/22
[58] Field of Search ................. 228/42, 44.5, 46, 49.3, 228/50, 57, 219; 219/59.1, 74, 60 R, 137.9, 137.63; 174/15 WF; 269/48.1, 43, 22

[56] References Cited

U.S. PATENT DOCUMENTS

| | | | |
|---|---|---|---|
| 3,095,844 | 7/1963 | Thielsch | 228/42 |
| 3,194,466 | 7/1965 | Davis | 228/42 |
| 3,292,254 | 12/1966 | Sloan | 228/42 |
| 3,387,761 | 6/1968 | Pickard | 228/42 |
| 4,465,220 | 8/1984 | Ledlow et al. | 228/50 |
| 4,529,861 | 7/1985 | Blanton | 219/137.63 |
| 4,685,662 | 8/1987 | Vaughn | 269/43 |

FOREIGN PATENT DOCUMENTS

| | | | |
|---|---|---|---|
| 126386 | 9/1980 | Japan | 219/59.1 |
| 37375 | 2/1986 | Japan | 219/59.1 |

Primary Examiner—Nicholas P. Godici
Assistant Examiner—Samuel M. Heinrich
Attorney, Agent, or Firm—Ladas & Parry

[57] ABSTRACT

The invention relates to an apparatus to be used when welding pipes together. The apparatus comprises a bellows structure (4, 5) for shielding the weld joint area by internal contact with the pipe ends on both sides of the weld joint (3). When the apparatus is inserted and, especially, pulled out after welding, the bellows tend to be damaged by the hot weld joint. It is the object of the invention to solve this problem. The object is achieved by providing both bellows (4, 5) with radial side supports (14, 15) dragging against the inner surface of the pipes and by arranging the bellows to contract within the radial side supports in the absence of an inner overpressure. Between the bellows (4, 5), centering discs (9, 10) are arranged on hoses (6, 7, 8) for leading a protective gas and compressed air. The hoses (6, 7, 8) are connected with the holders of the bellows by means of a through cotter pin provided with a spring (17) for keeping the pin stationary.

10 Claims, 5 Drawing Sheets

APPARATUS TO BE USED WHEN WELDING PIPES TOGETHER

The present invention relates to an apparatus to be used when welding pipes together, which apparatus comprises a bellows structure for shielding the weld joint area by internal contact with the pipe ends on both sides of the weld joint, and means for leading a compressed gas into and out of the bellows structure and for leading a protective gas into and out of the area shielded by the bellows.

It is generally known that the quality of a weld joint, especially at its so-called root, will be better, if the welding area on the root side is arranged in a protective gas, e.g. nitrogen. This implies that the inside of the pipes should be filled with a protective gas when pipe ends are welded together.

The general practice has been to fill the whole pipe line, which can be very long, with a protective gas, the consumption of which thus will be big, causing high costs. For centering the pipe ends and keeping them stationary, separate mechanical devices have been used.

In apparatuses that use a bellows structure, however the consumption of expensive protective gas can be remarkably reduced. Additionally, the pipe ends can be centered and kept stationary, and welding beads can be prevented from adhering to the inner surface of the pipe ends, from where it is difficult to remove them.

The apparatuses with typical bellows structure have, nevertheless, a serious disadvantage. Most bellows materials do not contract very much after releasing the over-pressure in the bellows, and although it is not difficult in itself to pull out the apparatus, the bellows will drag against the strongly heated weld joint which burns the bellows.

When pipes of relatively small diameter are welded together, as the fact often is in hydraulic and similar piping, a further difficult problem appears. The means for feeding a protective gas and compressed air, generally comprising three flexible hoses, often of a so-called semistiff type, will be situated so near each other that it is extremely difficult to carry out a tightening of screw connections. There is simply not enough room for usual tightening tools.

The object of the present invention is primarily to develop further a pipe welding apparatus using a bellows structure so as to eliminate the above-described drawbacks associated with the use of a typical bellows structure.

The object is achieved by means of the apparatus of the invention which is mainly characterized in that both bellows of the bellows structure are provided with radial supports for contact with the inner surface of the pipes, when the apparatus is arranged in its place and removed from there, respectively, and that the bellows are arranged to contract radially in the absence of inner pressure within the radial supports mentioned above.

Preferred embodiments are stated in more detail in the claims 2 to 10, and appear likewise from the following description with reference to enclosed drawing.

Figure 1:
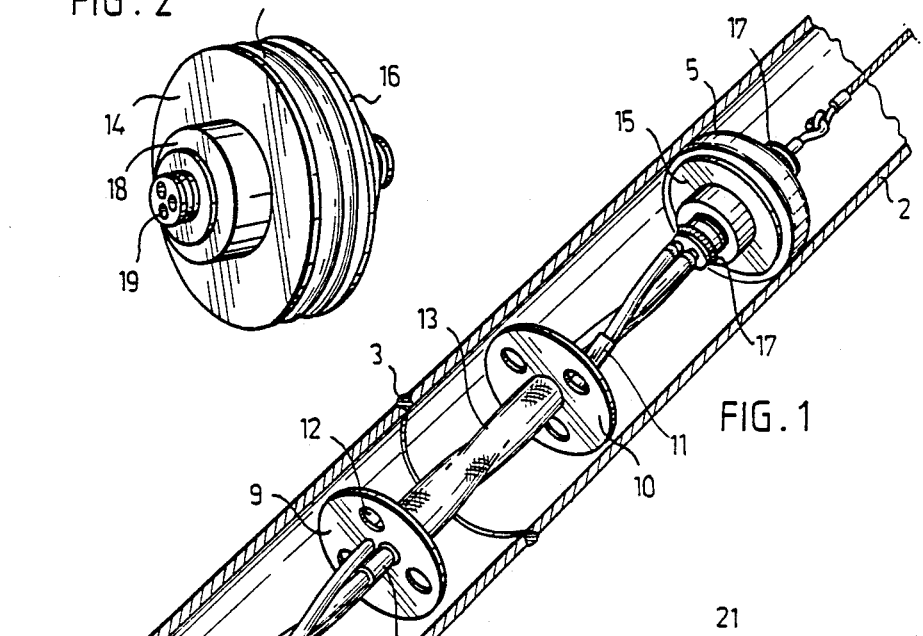
FIG. 1 shows an apparatus according to the invention in position for welding.

In FIG. 1, the pipes to be welded together are indicated by numerals 1 and 2, the weld joint is indicated by 3. The numerals 4 and 5 refer to bellows fastened on holders and arranged within the pipe 1 and 2, respectively, on both sides of the weld joint 3, which bellows in an inflated state, according to FIG. 1, shield the welding area in order to reduce the consumption of protective gas. The apparatus is brought in and pulled out in the same way as when laying cables, i.e. by means of a wire seen to the right of the bellows 5. One of three hoses 6, 7 and 8 is used to supply the bellows 4 and 5 with compressed air and to lead away the air, respectively, one of the remaining two hoses leads protective gas into the space between the bellows 4 and 5 and the other functions as outlet pipe for the protective gas; there is a need of leading out the protective gas especially in the final phase of the welding. Inlet and outlet openings for the protective gas, into and from the space between the bellows 4 and 5, preferably at different ends of the space, are provided e.g. in holders of the bellows (18 in FIG. 2), although not visible in the drawing.

Figure 2:
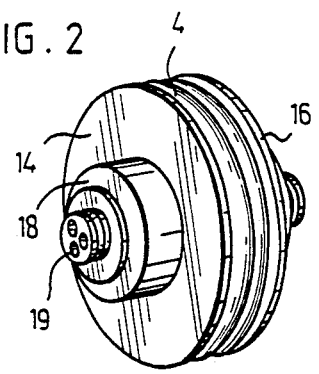
FIG. 2 shows a part of the bellows structure with the bellows contracted.

The hoses 6, 7 and 8 are preferably intertwisted, at least between the bellows 4 and 5. Centering devices, e.g. in the form of discs 9 and 10, are preferably arranged on the hoses near the weld joint 3. These centering discs are of greater significance when a pipe bend is welded, as will be seen later in connection with the FIGS. 3 and 6. Between the discs 9 and 10, there is preferably arranged a shield 13 around the hoses to prevent possible beads from the weld joint 3 from damaging the hoses. The numeral 11 refers to a sleeve connected to the centering disc 9 and clamped on one of the hoses. A corresponding clamping sleeve is provided at the centering disc 10, but preferably on another hose than the one for the sleeve 11, to maintain a good bending capacity within the area between the discs 9 and 10. The hose within the sleeve 11 is preferably reinforced internally to withstand the clamping force. Openings 12 in the discs 9 and 10 facilitate the necessary circulation of protective gas in the space shielded by the bellows 4 and 5. The numerals 14, 15 and 16 refer to radial side supports for the bellows 4 and 5, the purpose of these supports is to make it possible to pull out the apparatus after welding without the bellows 4 and 5 contacting the heated area at the weld 3, when the bellows are contracted (FIG. 2). The discs 14 and 16 drag against the pipes 1 and 2 when the apparatus is pulled out. The numeral 17 refers to a multi-coupling for quick-attachment and detachment of the hoses 6, 7 and 8 to and from the holder (body) 18 of the bellows structure. The numeral 19 refers to the receiving openings in the holder 18, which openings correspond to the hoses 6, 7 and 8.

Figures 3, 6:
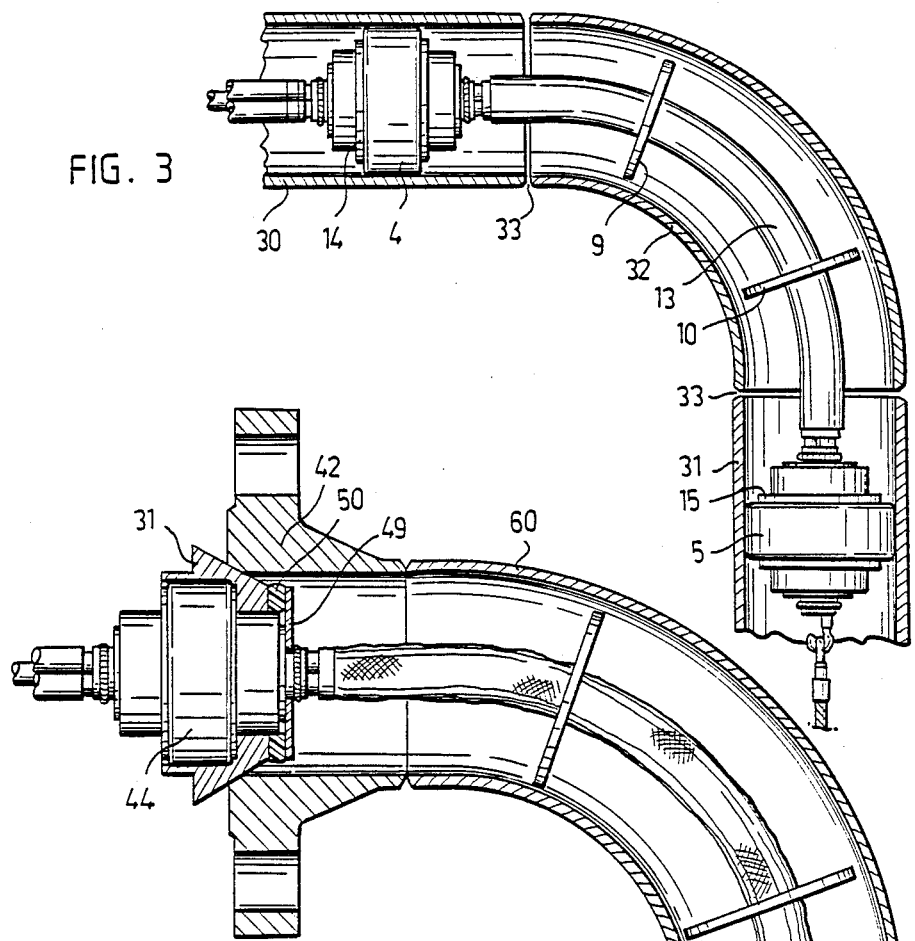
FIG. 3 shows the use of the apparatus when a pipe bend is welded.
FIG. 6 shows an embodiment for welding a flange at a pipe bend.

FIG. 3 shows the apparatus according to FIG. 1 when welding a pipe bend. The straight pipes are indicated 30 and 31, the connecting bend 32 and the weld joints 33. Depending on the stiffness of the hoses for air into the bellows 4 and 5, respectively, and for a protective gas into and from the area between these bellows, the centering discs 9 and 10 may be in contact with the pipe bend 32 outwards or inwards, or even lie freely, as in FIG. 3. The shield 13 for the hoses extends here along the whole space between the bellows 4 and 5.

If the weld joint is close to one of the bellows of the apparatus, e.g. if a flange shall be fastened by welding to a pipe, there is a great risk that the heat transferred through the material will destroy the bellows, if they are in direct contact with the flange. The FIGS. 4, 5, 6 and 7 show an embodiment for solving this problem.

Figure 4:
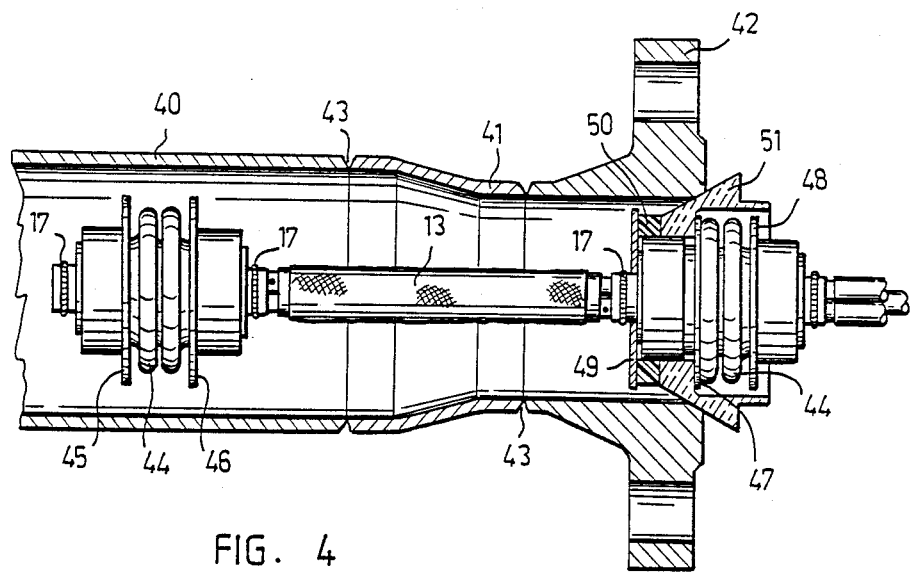
FIGS. 4 and 5 show an embodiment to be used when welding a flange, with the apparatus loosely inserted and in position for welding, respectively.
Figure 5:
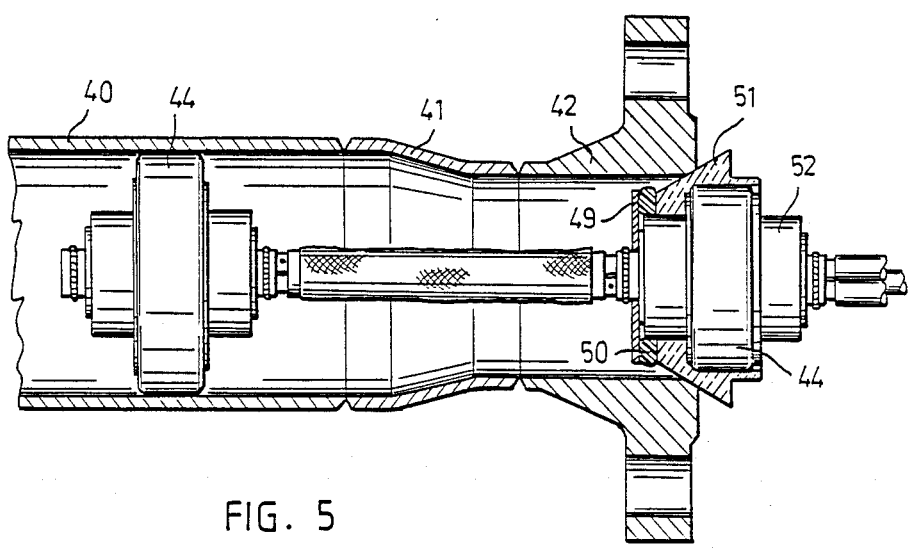

In the FIGS. 4 and 5, the pipe in question is designated 40, a tapering connection piece with 41 and the flange with 42. The welds between the pipe 40, the connection piece 41 and the flange 42 are designated 43. The numeral 44 refers to the bellows of the apparatus, equal to 4 and 5 in FIG. 1, the numerals 45–48 refer to radial supports, correspondingly. An axial stop is designated 49, an elastic packing 50 and a heat shield is designated 51.

FIG. 4 shows the apparatus loosely inserted; a play often exists between the flange 42 and the heat shield 51, although not showing in FIG. 4. FIG. 5 shows the apparatus in position for welding.

To achieve a satisfactory function, the heat shield 51 shall during welding be in firm abutment with the flange 42. This is achieved by cooperation with the elastic packing 50 and thereby that the radial support 48, outermost at the flange 42, is axially flexible. Without these, the apparatus would, simultaneously with the filling of the bellows 44 with compressed air, be pulled out to some extent, so that no firm contact between the heat shield 51 and the flange 42 would be reached. Thanks to the packing 50, in combination with the axial flexibility of the radial disc 48, the bellows 44 between the discs 45 and 46 have time to firmly engage the pipe 40 before an axial fixation occurs between the heat shield 51 and the flange 42. It is enough, if the disc 48 is axially flexible, but all discs 45–48 may as well be arranged flexible in the same way. Thus, the axial abutment between the heat shield 51 and the flange 42 occurs only after a steady engagement exists between the pipe 40 and the corresponding bellows 44. Consequently, all the support discs 45–48, can be loosely arranged on the respective holders 52, also in the embodiment according to FIG. 1, though the same need of flexibility does not really exist here. In principle, it is enough, if the outermost support disc 48 (FIG. 4) is axially movable; the apparatus can always be turned so that the movable disc is outermost, but a certain simplification of the assembling situation can naturally be reached by having the other outer support disc 45 axially flexible as well.

The embodiment of FIG. 6 is a combination of those of FIGS. 3 and 5. A pipe bend 60 replaces the connection piece 41 in FIG. 5.

Figure 7:
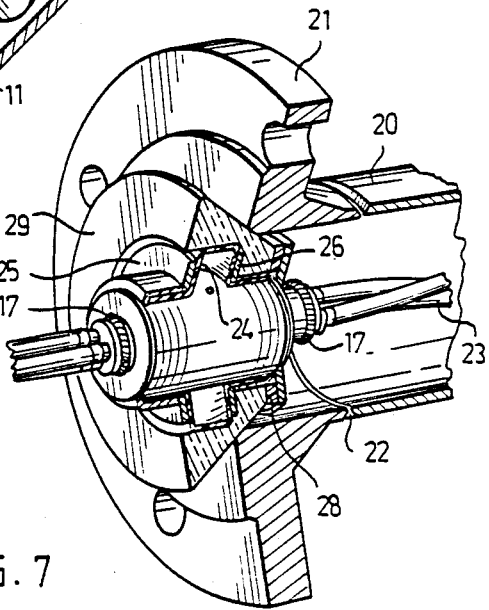
FIG. 7 is a sectional perspective view of the apparatus according to the FIGS. 4–6, at the flange.

FIG. 7 is a sectional perspective view of the arrangement at the flange in the FIGS. 4–6. The pipe is indicated by 20, the flange by 21, the weld by 22, the hoses by 23, the bellows by 24, the supporting discs by 25 and 26, the elastic packing by 27, the disc supporting the packing inwardly by 28 and the heatshield by 29.

Figure 8:
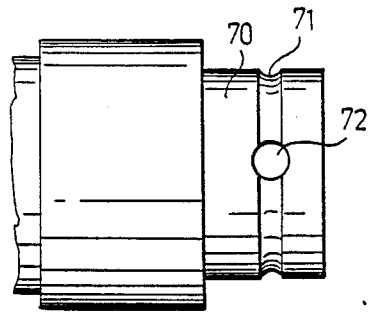
FIGS. 8–12 show a preferred embodiment for connection of the means for compressed air and a protective gas, respectively, with the bellows structure of the apparatus.
Figure 10:
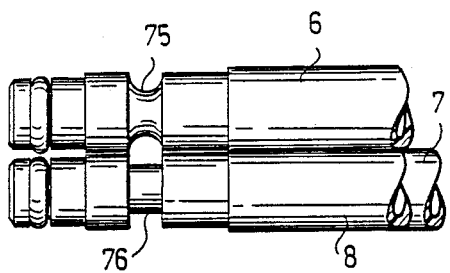
Figure 9:
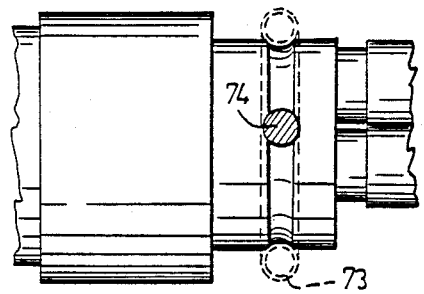
Figure 11:
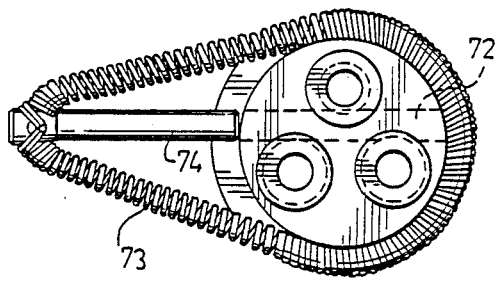
Figure 12:
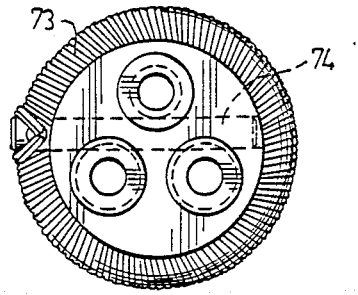
Figure 16:
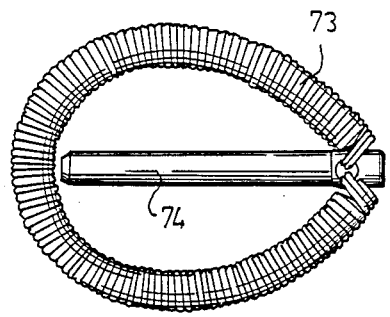
FIG. 16 shows a cotter pin included in the embodiment according to the FIGS. 8–12.

The FIGS. 8–12 show a preferred embodiment for the connection of the hoses 6, 7 and 8 with the respective bellows holders, i.e. with the receiving openings 19 in FIG. 2. In FIG. 8, the receiving body with receiving openings 19 for the hoses, is indicated by 70 and has an outer annular recess 71 and a through bore 72. Through the bore 72, a cotter pin 74 is inserted, which pin is kept in place by means of a spring 73 in the recess 71. The cotter pin 74 engages with annular recesses 75 and 76 on the connecting pieces of the hoses, FIG. 10, thus engaging all hoses simultaneously. In order to secure that the hose for compressed air of the bellows will be arranged in the right place, the annular recess of this hose, e.g. the one marked with 6, can have another cross section than corresponding recesses for the protective gas hoses 7 and 8. The cotter pin 74 then preferably has a corresponding cross section, formed by the recesses 75 and 76, as seen in FIG. 10. The cotter pin 74 and the spring 73 are shown separately in FIG. 16.

Figure 13:
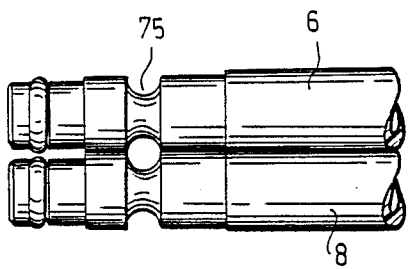
FIGS. 13–15 show an alternative embodiment for the same connection.
Figure 14:
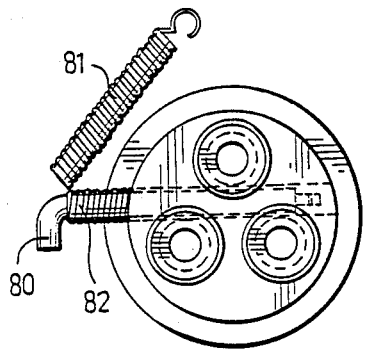
Figure 15:
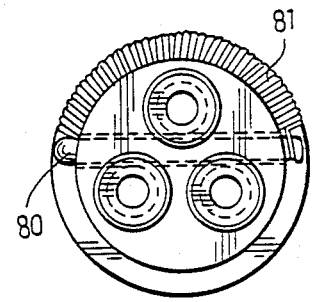

The FIGS. 13–15 show an alternative embodiment for the connection of the hoses 6, 7 and 8. In this embodiment, all recesses in the connecting pieces of the hoses are formed in the same way, with substantially semi-circular cross section 75. The cotter pin 80 has a round cross section and a part 81 of the spring, is fastened over half the periphery of the outer ring groove of the receiving piece, while the rest 82 of the spring is arranged on the cotter pin. Attachment and detachment is rapid also with this embodiment, but compared with the embodiment according to the FIGS. 9–12 and 16, a certain disadvantage exists therein that the cotter pin, with the spring, may be dropped, which can cause great problems e.g. on tank vessels and oil rigs exposed to difficult external circumstances.

The multi-coupling according to the FIGS. 8–16 can, of course, advantageously be used even in other connections, where there exists a need of rapid attachment and detachment, respectively, of several hoses or pipes running closely to each other. The amount of hoses and pipes, respectively, can be considerably bigger than three, it is only necessary to make the cotter pin longer.

The support discs 14, 15 etc. for the bellows may be made of metal or of a yielding material, such as nylon. The hoses for supply and discharge of a protective gas may be used for supplying and discharging a pickling acid, after weld is completed, or for performing pressure tests.

The bellows are preferably provided with a circumferential fold, as shown e.g. in FIG. 4, in order to have a proper contraction when the inner pressure of the bellows is released. In addition, a spring element, e.g. a helical spring, may be placed around the bellows in said fold.

As alternatives to the cotter pin connection could be contemplated a central disc engaging the annular recess 75 and 76 from the inside, or a sleeve with an inwardly directed circumferential flange engaging the recesses 75 and 76 from the outside.

I claim:

1. Apparatus to be used when welding pipes together, which apparatus comprises:
    at least two inflatable seal members for shielding a weld joint area by internal contact with end portions of the pipes on both sides of the weld joint so that a shielded space can be formed; and
    means for leading a compressed gas into and out of the seal members and for leading a protective gas into and out of the space shielded by the seal members, wherein each of the inflatable seal members is provided with at least two radially extending side supports, one inside and the other outside the space shielded by the seal members, and that said seal members, when deflated, are arranged radially within said side supports in order to avoid contact between the seal members and the pipes when removing the apparatus after welding.

2. Apparatus according to claim 1, wherein at least one of the radially extending side supports outside of the shielded space is arranged to be axially flexible.

3. Apparatus according to claim 1, wherein the radially extending side supports are made of a heat resistant material.

4. Apparatus according to claim 1, wherein the seal members are provided with a circumferential fold for radially contracting the seal members when deflated.

5. Apparatus according to claim 1 wherein a spring element is arranged circumferentially around each seal member for radially contracting the seal member when deflated.

6. Apparatus according to claim 1 wherein centering devices are arranged between the seal members on the means for leading compressed air and a protective gas.

7. Apparatus according to claim 1, wherein ends of the radially extending side supports are provided with openings to receive connection nozzles of the means for leading compressed air and a protective gas, and that each one of these nozzles is provided with an annular recess, the nozzles are arranged to be kept stationary together by means of a cotter pin anchored in a cross bore in the radially extending side supports and engaging with the recesses of the nozzles.

8. Apparatus according to claim 7, wherein the cotter pin is provided with a helical spring to be laid into an outer peripheral groove on the radially extending side supports.

9. Apparatus to be used when welding a flange to a pipe which apparatus comprises:
 at least two inflatable seal members for shielding a weld joint area by internal contact of a first seal member with an end portion of the pipe on one side of the weld joint, and the internal contact of a second seal member within a heat shield that contacts the flange on the other side of the weld joint, so that a shielded space can be formed;
 means for leading a compressed gas into and out of the seal members and for leading a protective gas into and out of the space shielded by the seal members, each of the inflatable seal members is provided with a radially extending inside side support inside the space shielded by the seal members and a radially extending outside side support that is axially flexible and positioned outside the space shielded by the seal members, said seal members when deflated are arranged radially within said inside and outside side supports in order to avoid contact between the seal members and the pipe when removing the apparatus after welding;
 an axial stop, provided at the flange, is positioned inwardly from the respective radially extending inside side support of the second seal member; and
 an elastically flexible packing arranged between and contacting the heat shield and said axial stop, said heat shield extends outside an end portion of the flange so as to be arranged between said elastically flexible packing and said radially extending outside side support so as to surround the second seal member.

10. Apparatus to be used when welding pipes together, which apparatus comprises:
 at least two inflatable seal members for shielding the weld joint area by internal contact with the pipe ends on both sides of the weld joint so that a shielded space can be formed;
 means for leading a compressed gas into and out of the seal members and for leading a protective gas into and out of the space shielded by the seal members, said means comprises at least three hoses that are twisted together between the seal members;
 two radially extending side supports, provided on each seal member, said side supports having an inside side support inside the space shielded by the seal members and an outside side support outside the space shielded by the seal members, said seal members when deflated are arranged radially within said supports in order to avoid contact between the seal members and the pipes when removing the apparatus after welding; and
 centering devices, arranged between the seal members, fastened on successively different hoses by means of a clamping sleeve.

* * * * *